United States Patent
Lin et al.

(10) Patent No.: US 11,364,869 B1
(45) Date of Patent: Jun. 21, 2022

(54) THORAX AND THIGH AIRBAG SYSTEM FOR RECLINED PASSENGERS

(71) Applicant: GM GLOBAL TECHNOLOGY OPERATIONS LLC, Detroit, MI (US)

(72) Inventors: Chin-Hsu Lin, Troy, MI (US); Louis D. Thole, Grosse Pointe Park, MI (US); David Acosta, Royal Oak, MI (US); Yi-pen Cheng, Troy, MI (US); Paul E. Krajewski, Troy, MI (US); Gary L. Jones, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/179,631

(22) Filed: Feb. 19, 2021

(51) Int. Cl.
*B60R 21/207* (2006.01)
*B60R 21/013* (2006.01)
*B60R 21/01* (2006.01)
*B60R 21/00* (2006.01)

(52) U.S. Cl.
CPC .......... *B60R 21/207* (2013.01); *B60R 21/013* (2013.01); *B60R 2021/0034* (2013.01); *B60R 2021/0044* (2013.01); *B60R 2021/0053* (2013.01); *B60R 2021/01013* (2013.01)

(58) Field of Classification Search
CPC . B60R 2021/0034; B60R 21/204; B60N 2/42; B60N 2/427
See application file for complete search history.

(56) References Cited

U.S. PATENT DOCUMENTS

| | | |
|---|---|---|
| 3,623,768 A * | 11/1971 | Capener ............... B60N 2/757 297/330 |
| 6,662,092 B2 | 12/2003 | Wang et al. |
| 6,726,260 B1 | 4/2004 | Wang et al. |
| 6,816,766 B2 | 11/2004 | Sala et al. |
| 7,232,178 B2 | 6/2007 | Neal et al. |
| 7,334,656 B2 | 2/2008 | Kramarczyk et al. |
| 7,369,928 B2 | 5/2008 | Wang et al. |
| 7,401,846 B2 | 7/2008 | Browne et al. |
| 7,997,620 B1 | 8/2011 | Dong et al. |
| 8,135,506 B2 | 3/2012 | Hansen et al. |
| 8,226,119 B2 | 7/2012 | Dong et al. |
| 8,335,616 B2 | 12/2012 | Neal et al. |
| 8,339,268 B2 | 12/2012 | Deng et al. |
| 8,606,465 B2 | 12/2013 | Wang et al. |
| 8,727,377 B2 | 5/2014 | Wang |
| 8,967,665 B1 | 3/2015 | Lin et al. |

(Continued)

FOREIGN PATENT DOCUMENTS

| | | | | |
|---|---|---|---|---|
| CN | 112744178 A * | 5/2021 | ............. | B60R 22/26 |
| DE | 102017128097 A1 * | 5/2019 | ............. | B60N 3/002 |

(Continued)

*Primary Examiner* — Nicole T Verley (57) ABSTRACT

A vehicle safety seat system comprises: i) a vehicle seat configured to move to a substantially reclining position, the vehicle seat comprising a seat back and a seat bottom; and ii) a first support arm associated with the seat back, the first support arm including a first airbag on a lower surface of the first support arm, the first support arm holding the first airbag in a position above the thorax of a passenger reclining in the vehicle seat. The first airbag inflates in the event of a collision and provides protection between the first support arm and the thorax of the passenger.

19 Claims, 8 Drawing Sheets

(56) References Cited

U.S. PATENT DOCUMENTS

| | | | |
|---|---|---|---|
| 9,150,238 B2 | 10/2015 | Alcazar et al. | |
| 9,487,177 B2* | 11/2016 | Schneider | B60R 21/231 |
| 10,173,631 B2 | 1/2019 | Perez Garcia et al. | |
| 10,214,132 B2 | 2/2019 | Wang et al. | |
| 10,252,694 B2 | 4/2019 | Lin et al. | |
| 10,407,015 B2* | 9/2019 | Belwafa | B60R 21/23138 |
| 10,479,231 B2* | 11/2019 | Dry | B60N 2/14 |
| 10,479,310 B2* | 11/2019 | Dry | B60R 21/207 |
| 10,513,206 B2* | 12/2019 | Spahn | B60N 2/4207 |
| 10,569,732 B2* | 2/2020 | Nagasawa | B60R 21/207 |
| 10,780,857 B1* | 9/2020 | Rajasingham | B60R 19/205 |
| 10,814,818 B2* | 10/2020 | Dry | B60R 21/217 |
| 10,875,486 B2* | 12/2020 | Kim | B60R 21/207 |
| 10,940,824 B2* | 3/2021 | Nagasawa | B60R 21/231 |
| 11,046,215 B1* | 6/2021 | Rajasingham | B60R 21/055 |
| 11,084,452 B2* | 8/2021 | Nagasawa | B60R 21/231 |
| 11,110,881 B1* | 9/2021 | Deng | B60R 21/2334 |
| 11,117,539 B2* | 9/2021 | Masuda | B60N 2/4214 |
| 11,180,102 B1* | 11/2021 | Jaradi | B60R 21/2338 |
| 2004/0051632 A1 | 3/2004 | Sala et al. | |
| 2004/0102883 A1 | 5/2004 | Sala et al. | |
| 2004/0133325 A1 | 7/2004 | Neal et al. | |
| 2004/0251670 A1 | 12/2004 | Wang et al. | |
| 2010/0121536 A1 | 5/2010 | Wang et al. | |
| 2011/0254330 A1* | 10/2011 | Lich | B60N 2/4279 297/216.1 |
| 2012/0053793 A1 | 3/2012 | Sala et al. | |
| 2012/0053794 A1 | 3/2012 | Alcazar et al. | |
| 2016/0039385 A1* | 2/2016 | Watamori | B60R 21/23138 280/730.1 |
| 2016/0052477 A1* | 2/2016 | Tobata | B60N 2/002 280/730.1 |
| 2016/0059813 A1 | 3/2016 | Neal et al. | |
| 2016/0082915 A1* | 3/2016 | Madaras | B60R 21/231 297/216.2 |
| 2016/0288762 A1* | 10/2016 | Deng | B60R 21/2342 |
| 2018/0281725 A1* | 10/2018 | Nagasawa | B60N 2/79 |
| 2019/0111877 A1* | 4/2019 | Line | B60R 21/233 |
| 2019/0118754 A1* | 4/2019 | Dry | B60N 2/14 |
| 2019/0152359 A1* | 5/2019 | Spahn | B60N 2/4279 |
| 2019/0275974 A1* | 9/2019 | Yetukuri | B60R 21/055 |
| 2020/0101921 A1* | 4/2020 | Nagasawa | B60R 21/2334 |
| 2020/0101927 A1* | 4/2020 | Nagasawa | B60R 21/207 |
| 2020/0189514 A1* | 6/2020 | Yoo | B60R 21/2338 |
| 2021/0107426 A1* | 4/2021 | Choi | B60N 3/002 |

FOREIGN PATENT DOCUMENTS

| | | | | |
|---|---|---|---|---|
| DE | 102018203731 A1 | * | 9/2019 | B60N 2/22 |
| DE | 102018206091 A1 | * | 10/2019 | B60R 21/18 |
| DE | 102018214880 A1 | * | 3/2020 | B60R 21/207 |
| DE | 102019124091 A1 | * | 7/2020 | B60R 21/233 |
| DE | 102020204852 A1 | * | 11/2020 | B60R 21/231 |
| DE | 102019118840 A1 | * | 1/2021 | B60N 2/01 |
| DE | 102019008850 A1 | * | 6/2021 | B60R 21/207 |
| EP | 3666603 A1 | * | 6/2020 | B60R 21/23138 |
| JP | 2018161974 A | * | 10/2018 | |
| JP | 2018172003 A | * | 11/2018 | |
| JP | 6626764 B2 | | 12/2019 | |
| JP | 2020179826 A | * | 11/2020 | B60N 2/427 |
| WO | WO-2019208947 A1 | * | 10/2019 | B60R 21/264 |

\* cited by examiner

THORAX AND THIGH AIRBAG SYSTEM FOR RECLINED PASSENGERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional vehicles use both manual and passive restraint systems to ensure passenger safety in case of an accident. A passive restraint system works automatically and requires no action on the part of the automobile passenger. A well-known example of a passive restraint system is the airbag, which deploys automatically during an accident. The seat belt is perhaps the best-known manual restraint system. The seat belt requires the passenger to buckle the belt in order to ensure his or her own safety.

However, the development of autonomous vehicles has introduced unconventional types of seats in passenger compartments. Many of these new seats enable a passenger to recline almost to a horizontal position. This creates challenges to the effectiveness of conventional manual and passive restraint systems.

SUMMARY

Further areas of applicability of the present disclosure will become apparent from the detailed description, the claims and the drawings. The detailed description and specific examples are intended for purposes of illustration only and are not intended to limit the scope of the disclosure.

It is an aspect of the present disclosure to provide a vehicle seat safety system. The vehicle safety seat system comprises: i) a vehicle seat configured to move to a substantially reclining position, the vehicle seat comprising a seat back and a seat bottom; and ii) a first support arm associated with the seat back, the first support arm including a first airbag on a lower surface of the first support arm, the first support arm holding the first airbag in a position above the thorax of a passenger reclining in the vehicle seat. The first airbag inflates in the event of a collision and provides protection between the first support arm and the thorax of the passenger.

In one embodiment, the vehicle seat safety system further comprises a first housing associated with the seat back, wherein the first support arm comprises a base section mounted within the first housing.

In another embodiment, the first support arm comprises an upper section that holds the first airbag in position above the thorax of the passenger.

In still another embodiment, the base section and the upper section of the first support arm are rotatably coupled to allow the passenger to enter and exit the vehicle seat.

In yet another embodiment, the base section and the upper section of the first support arm are rotatably coupled by a hinge that allows the upper section to be rotated into a position above the thorax of the passenger.

In a further embodiment, the hinge is lockable.

In a still further embodiment, the base section of the first support arm is spring mounted within the first housing such that the first support arm may extend outward from the first housing when the first airbag is inflated.

In a yet further embodiment, the vehicle seat safety system further comprises a second support arm associated with the seat bottom, the second support arm including a second airbag on a lower surface of the second support arm, the second support arm holding the second airbag in a position above the thighs of the passenger.

In one embodiment, the second airbag inflates in the event of a collision and provides protection between the second support arm and the thighs of the passenger.

In another embodiment, the vehicle seat safety system further comprises a second housing associated with the seat bottom, wherein the second support arm comprises a base section mounted within the second housing.

In still another embodiment, the second support arm comprises an upper section that holds the second airbag in position above the thighs of the passenger.

In yet another embodiment, the base section and the upper section of the second support arm are rotatably coupled to allow the passenger to enter and exit the vehicle seat.

In a further embodiment, the base section and the upper section of the second support arm are rotatably coupled by a hinge that allows the upper section to be rotated into a position above the thighs of the passenger.

In a still further embodiment, the base section of the second support arm is spring mounted within the second housing such that the second support arm may extend outward from the second housing when the second airbag is inflated.

It an another object of the present disclosure to provide a method of operating a vehicle seat safety system associated with a vehicle seat configured to move to a substantially reclining position. The vehicle seat comprises a seat back and a seat bottom. The method comprises: i) holding using a first support arm a first airbag in a position above the thorax of a passenger reclining in the vehicle seat, wherein the first support arm is associated with the seat back; ii) detecting a collision; and iii) in response to the collision, inflating the first airbag to provide protection between the first support arm and the thorax of the passenger.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes a vehicle seat that incorporates a thorax airbag and a thigh airbag to protect a passenger in a reclining position. Incorporating the thorax and thigh airbags may contain a passenger on a highly reclined seat configuration during front and rear impacts. The least intrusive thorax covering support arm and the thigh covering support arm act as reflection and support surfaces to deploy the airbags in a collision. The airbags are fabricated to provide the maximum contact surface and uniform pressure to contain the reclined passenger. A spring mechanism limits the airbag force acting on the passenger.

Figure 1:
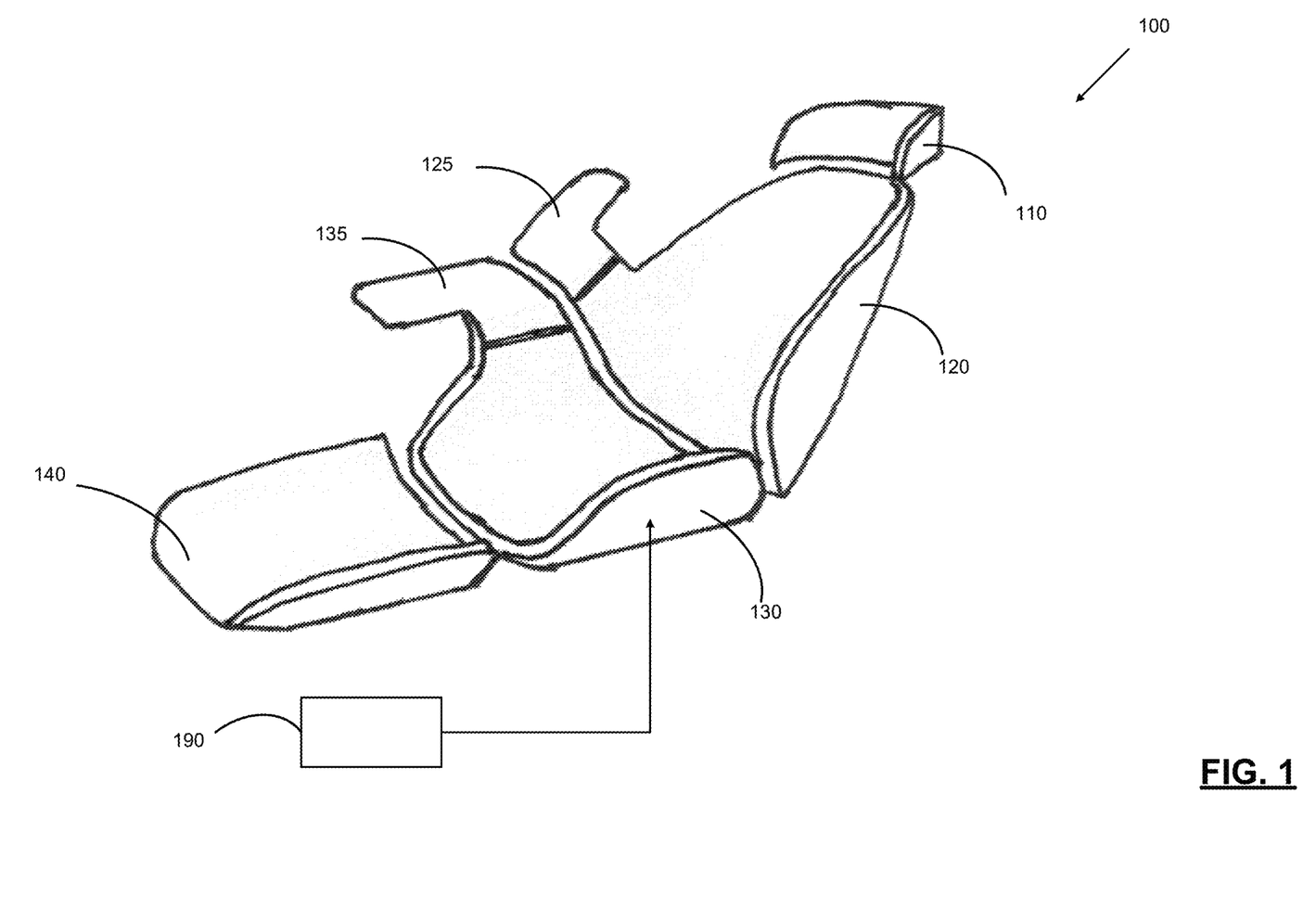
FIG. 1 is a perspective view of a vehicle seat adapted to incorporate thorax and thigh airbags according to an embodiment of the present disclosure.

FIG. 1 is a perspective view of a vehicle seat 100 adapted to incorporate thorax and thigh airbags according to an embodiment of the present disclosure. The vehicle seat comprise a headrest 110, a seat back 120, a seat bottom 130, and a leg support 140. The seat back 120 includes a thorax covering support arm 125 that includes an airbag (not shown) on its lower surface. The seat bottom 130 includes a thigh covering support arm 135 that includes an airbag (not shown) on its lower surface. In FIG. 1, the support arms 125 and 135 are rotated outward so that a passenger may enter and recline on the vehicle seat 100. According to an advantageous embodiment, each of the support arms 125 and 135 comprises two portions that are coupled by lockable hinges that enable the support arms 125 and 135 to be rotated.

The vehicle seat 100 is coupled to a collision detection module 190 that triggers the inflation of the airbags on support arm 125 and support arm 135 in the event of a collision. Each airbag may include a pyrotechnic device that detects a trigger signal from the collision detection module 190 and, in response, produces high-pressure gases that rapidly inflate the airbags. In alternate embodiments, the pyrotechnic device may be incorporated elsewhere in the vehicle seat 100 or outside the vehicle seat 100 and deliver the high-pressure gases via one or more conduits.

Figure 2:
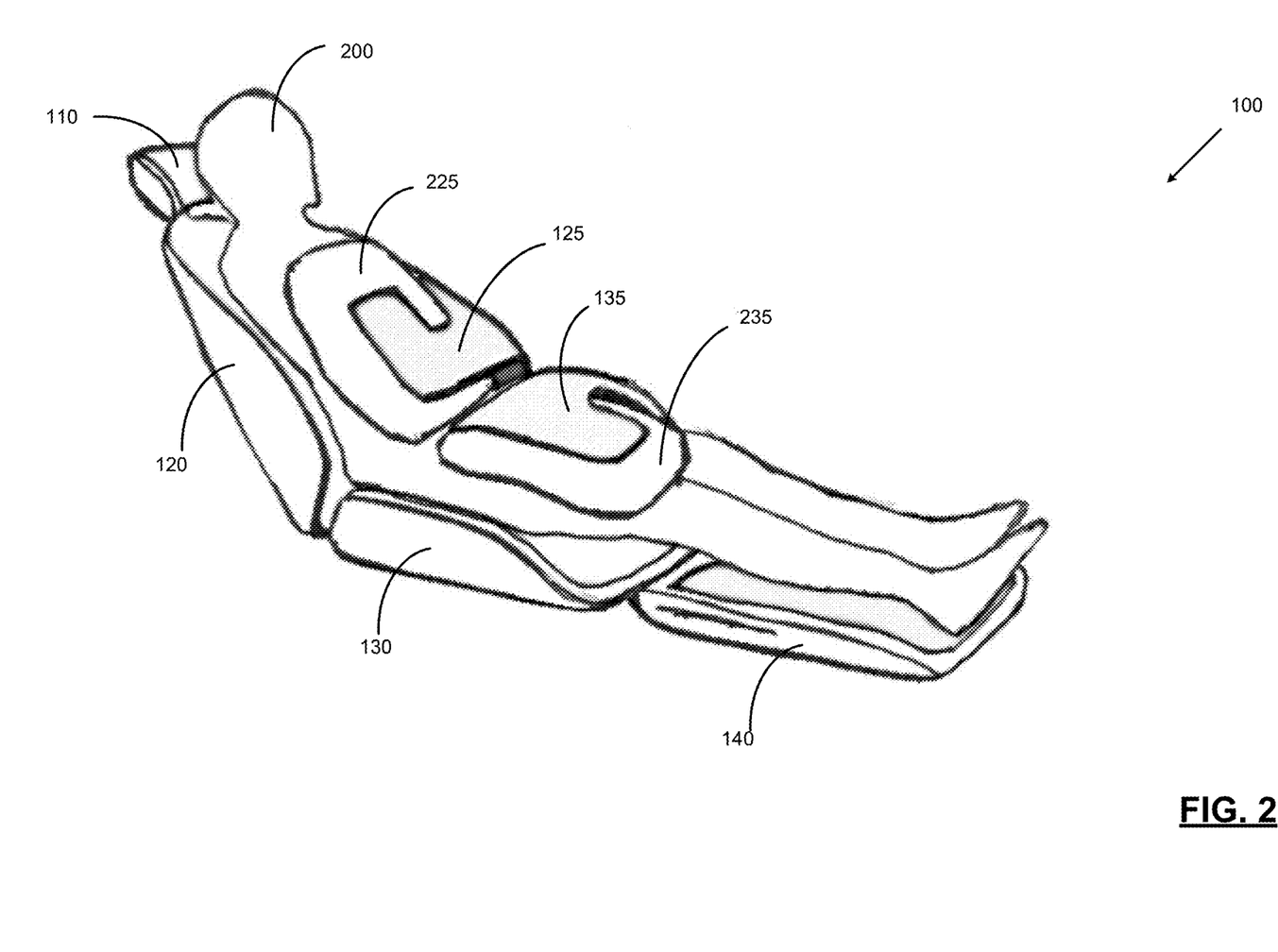
FIG. 2 is a perspective view of a vehicle seat with the thorax and thigh airbags deployed according to an embodiment of the present disclosure.

FIG. 2 is a perspective view of the vehicle seat 100 with the thorax and thigh airbags deployed according to an embodiment of the present disclosure. FIG. 2 differs from FIG. 1 in that the support arm 125 and support arm 135 are mounted on the left side of the vehicle seat 100, rather than the right side. According to an exemplary embodiment of the disclosure, the support arm 125 and support arm 135 are respectively attached to the seat back 120 and the seat bottom 130 by lockable hinges. The hinges allow the support arm 125 and support arm 135 to rotate out of the way so that the passenger 200 can get into the vehicle seat 100. After the passenger is reclined in the vehicle seat 100, the passenger 200 rotates the support arm 125 and support arm 135 back into place and locks the hinges.

In FIG. 2, the airbag 225 has deployed from the support arm 125 and provides protection for the thorax (or chest) of the passenger 200. The collision impact may throw the body of the passenger 220 forward into the support arm 125. In such an event, the support arm 125 will restrain the passenger 200 in place in the vehicle seat 100. The airbag 225 spreads the impact of the passenger 200 against the support arm 125 across a larger region of the chest than the support arm 125 alone would.

Similarly, the airbag 235 has deployed from the support arm 135 and provides protection for the thighs and pelvic area of the passenger 200. The support arm 135 will also restrain the passenger 200 in place in the vehicle seat 100 after a collision. Likewise, the airbag 235 spreads the impact of the passenger 200 against the support arm 135 across a larger region of the thighs and pelvic area than the support arm 135 alone would.

Figure 3:
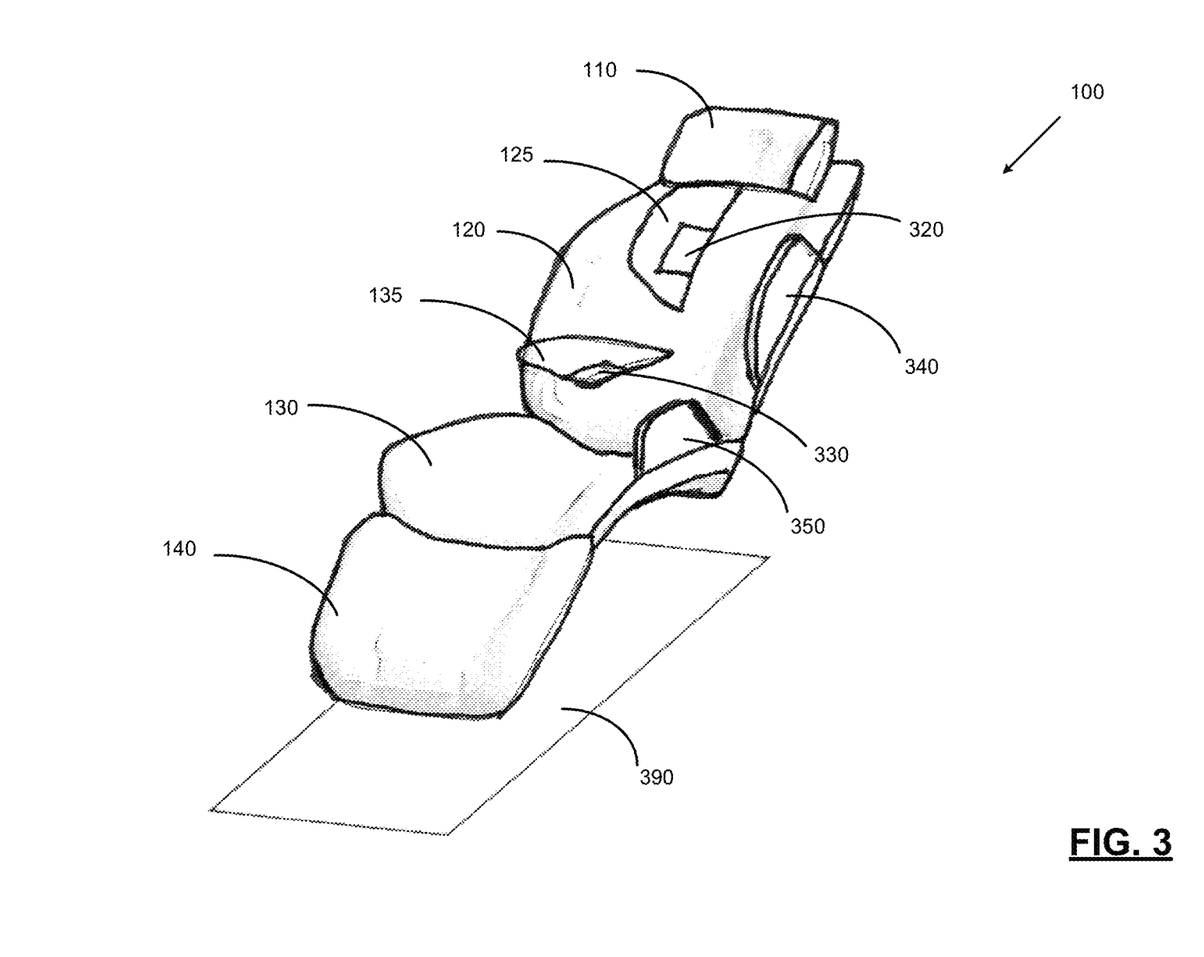
FIG. 3 is a perspective view of a vehicle seat according to an embodiment of the present disclosure.

FIG. 3 is a perspective view of the vehicle seat 100 according to an embodiment of the present disclosure. In FIG. 3, the vehicle seat 100 further includes a base 390 on which the vehicle seat 100 is mounted. The top of the support arm 125 is shown in silhouette form to illustrate the airbag system 320 containing airbag 225 on the lower surface of the support arm 125. Similarly, the top of the support arm 135 is shown in silhouette form to illustrate the airbag system 330 containing airbag 235 on the lower surface of the support arm 135. A housing 340 mounted along the edge of the seat back 120 receives the base section (not shown) of the support arm 125. Another housing 350 mounted along the edge of the seat bottom 130 receives the base section (not shown) of the support arm 135.

Figure 4A:
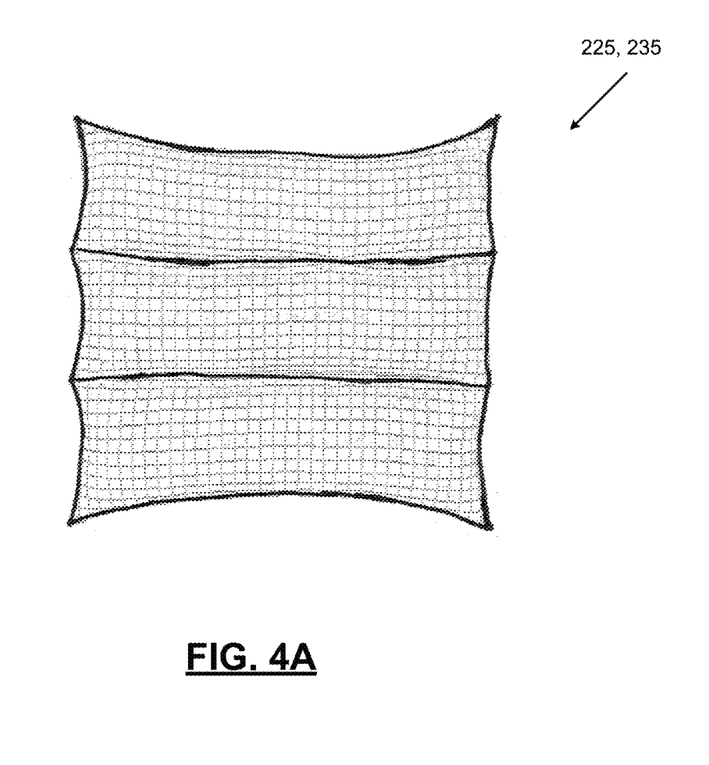
FIG. 4A is a top view of an exemplary airbag according to an embodiment of the present disclosure.
Figure 4B:
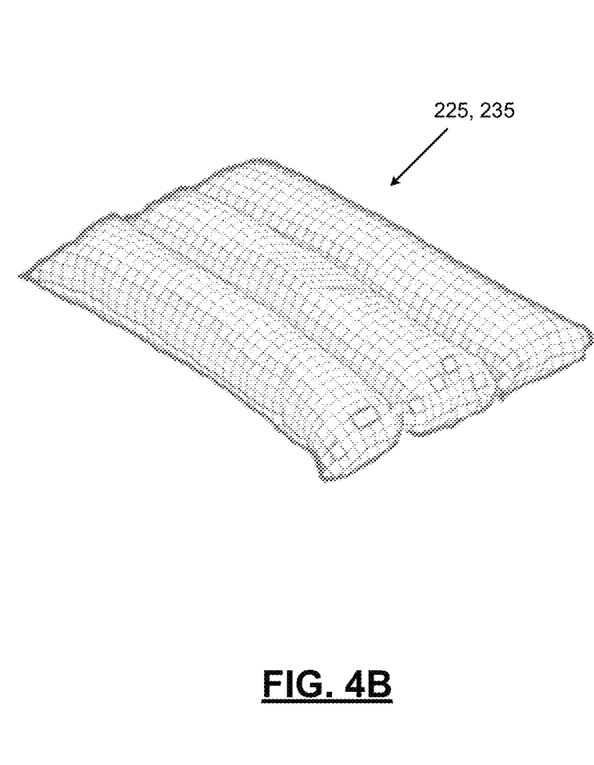
FIG. 4B is a perspective view of an exemplary airbag according to an embodiment of the present disclosure.

FIG. 4A is a top view of the exemplary airbags 225 and 235 according to an embodiment of the present disclosure. FIG. 4B is a perspective view of the exemplary airbags 225 and 235. The airbags 225 and 235 comprise three separate tube-shaped chamber that are stitched together. In an exemplary embodiment, the chambers may be inflated by separate conduits that bring high-pressure gas into each chamber from the pyrotechnic device. In this manner, a leak or failure of one chamber will not affect the other chambers.

Figure 5:
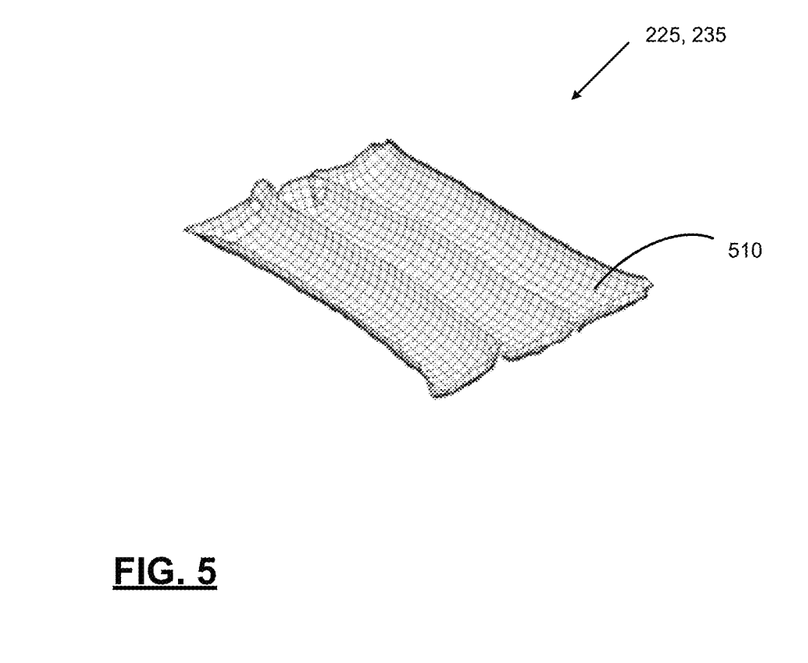
FIG. 5 is a cutaway view of an exemplary airbag according to an embodiment of the present disclosure.

FIG. 5 is a cutaway view of the exemplary airbag 225 and 235 according to an embodiment of the present disclosure. In FIG. 5, the top half of the airbag is cutaway, revealing the interior of the bottom half of the airbag. The shape of the top half mirrors the shape of the bottom half of the airbags 225 and 235.

Figure 6:
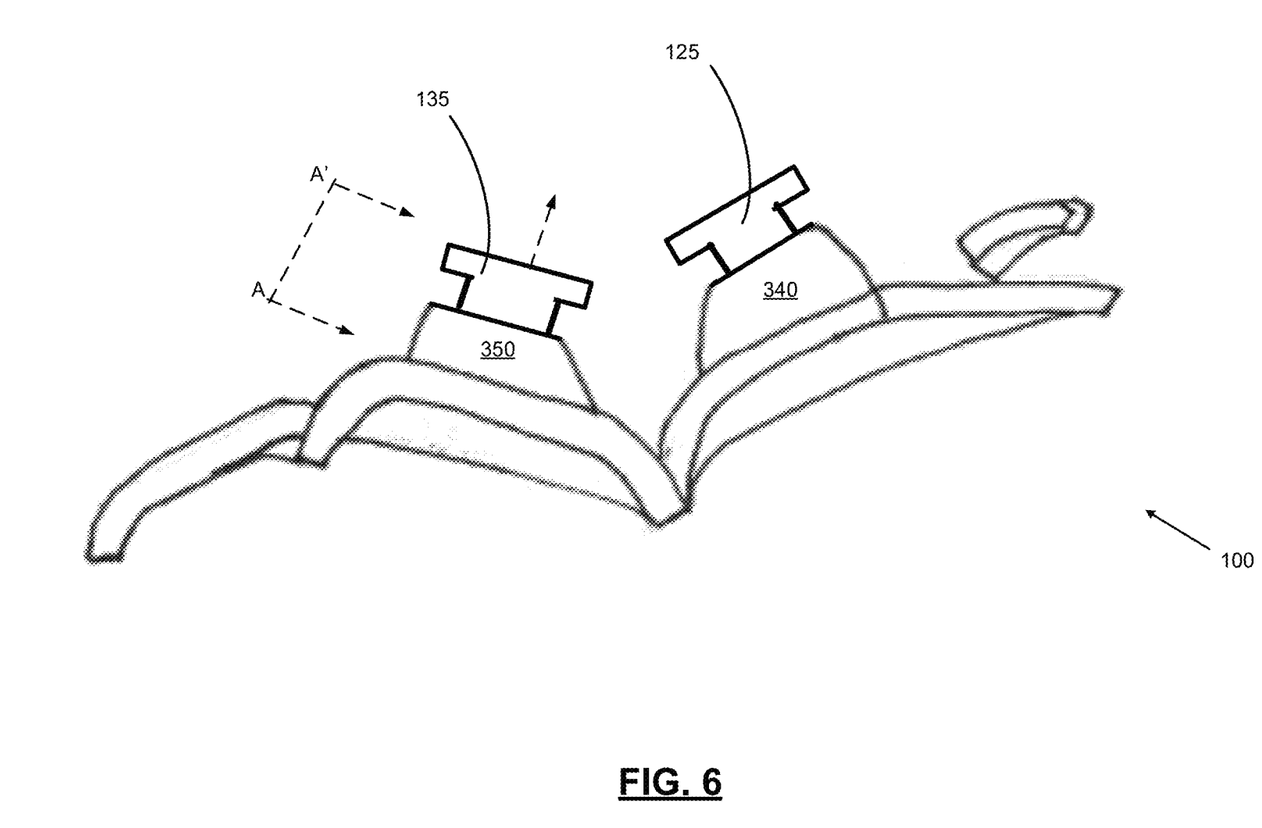
FIG. 6 is a side view of a vehicle seat adapted to incorporate thorax and thigh airbags according to an embodiment of the present disclosure.

FIG. 6 is a side view of the vehicle seat 100 adapted to incorporate thorax and thigh airbags according to an embodiment of the present disclosure. The base section of the support arm 125 is inserted into the housing 340. Likewise, the base section of the support arm 135 is inserted into the housing 350. The support arms 125 and 135 are locked into position over the thorax and thighs of the passenger 200.

Figure 7:
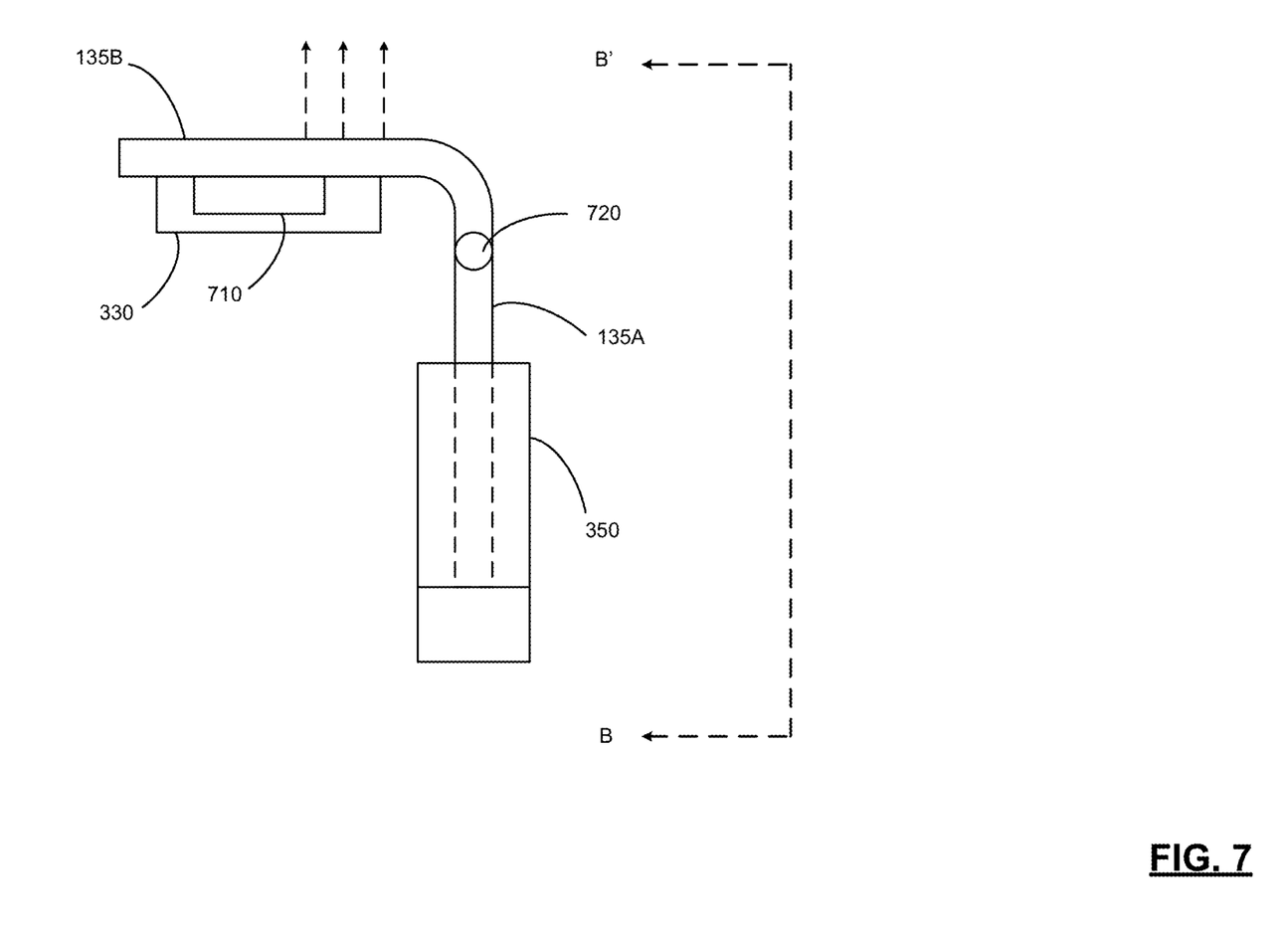
FIG. 7 is an end view along dotted lines A-A' in FIG. 6 according to an embodiment of the present disclosure.

FIG. 7 is an end view of the support arm 135 along dotted lines A-A' in FIG. 6 according to an embodiment of the present disclosure. The support arm 135 comprises two sections: a base section 135A mounted within the housing 350 and an upper section 135B that extends over the thighs (not shown) of the passenger 200. A lockable hinge 720 rotatably connects the upper section 135B and the lower section 135A.

The airbag system 330 containing airbag 235 is disposed on a lower surface of the upper section 135B. The airbag system 330 also may comprise an airbag (AB) inflation system 710 that includes the pyrotechnic device that rapidly produce high-pressure gas when ignited. However, when the airbag 235 inflates, it exerts a powerful downward force on the thighs and pelvic area of the passenger 200. According to the principles of the present disclosure, this downward force may be mitigated by spring-mounting the base section 135A within the housing 350 so that the support arm 135 may recoil upward (as indicated by the dotted line arrows) when the airbag 235 inflates.

The support arm 125 and the housing 340 operate in a similar manner to the support arm 135 and the housing 350 and need not be described separately.

Figure 8:
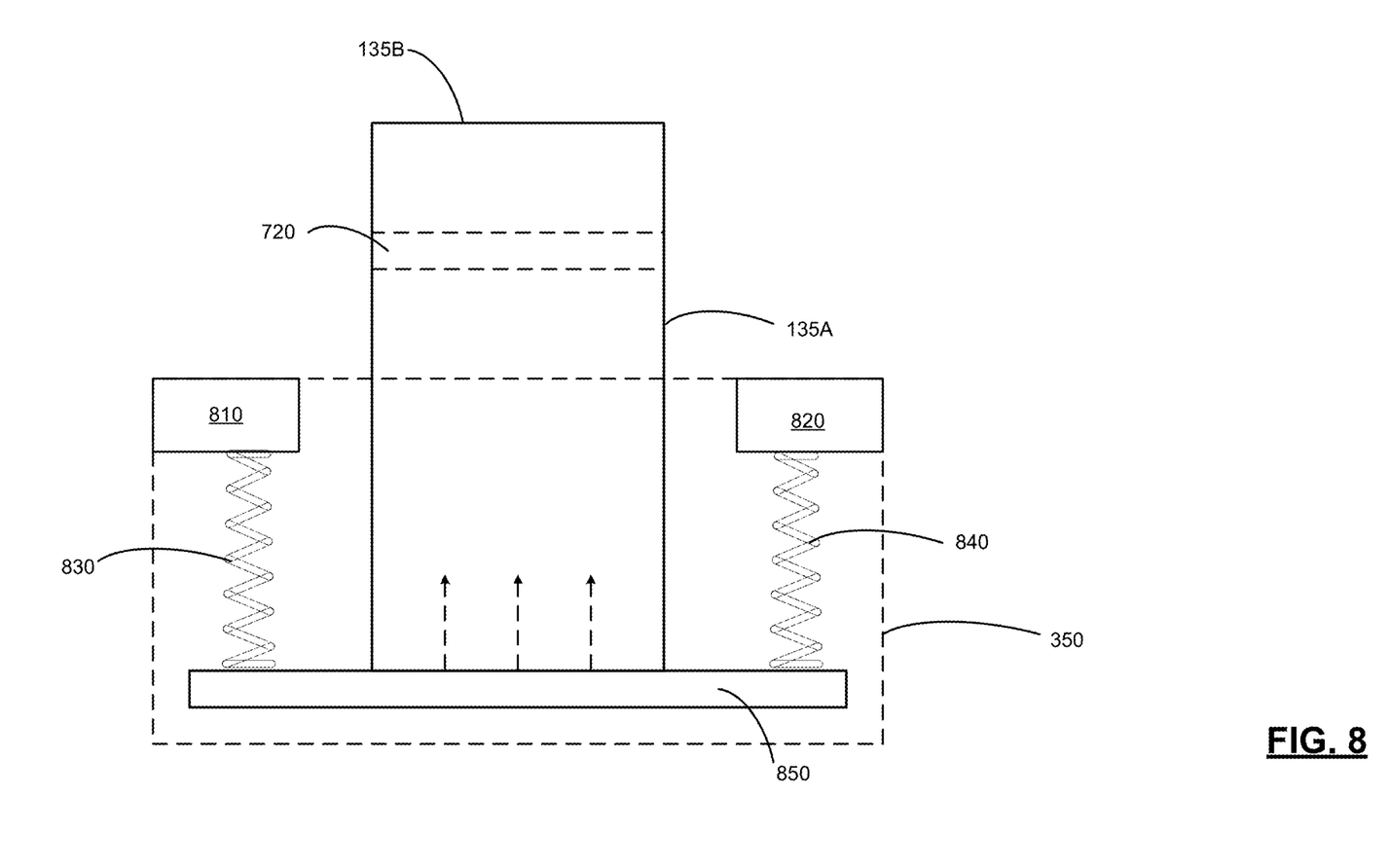
FIG. 8 is a side view along dotted lines B-B' in FIG. 7 according to an embodiment of the present disclosure.

FIG. 8 is a transparent side view along dotted lines B-B' in FIG. 7 according to an embodiment of the present disclosure. For simplicity of illustration and description, the housing 350 has a rectangular shape in FIG. 8, rather than the trapezoidal shape in FIG. 7 and the earlier figures. The housing 350 is also shown with a dotted line to illustrate the elements inside of the housing 350. The base section 135A is mounted on a base platform 850 inside the housing 350. The base platform 850 is coupled to the stops 810 and 820 by the springs 830 and 840. The stops 810 and 820 are fixed in position inside the housing 350 and cannot move.

When the airbag 235 inflates, the force drives the support arm 135 upward, as indicated by the dotted arrows in FIG. 7. However, this upward movement causes the support arm 135 to pull the base platform 850 upward, as indicated by the dotted arrows in FIG. 8. The upward movement of the base platform 850 compresses the springs 830 and 840, which are pressed against the fixed stops 810 and 820.

The net effect is to allow limited upward movement of the support arm 135 when the airbag 235 inflates, thereby easing pressure against the thighs and pelvic area of the passenger 200. The support arm 125 and the housing 340 operate in a similar manner to the support arm 135 and the housing 350 and thereby allow limited upward movement of the support arm 125 when the airbag 225 inflates, thereby easing pressure against the thorax of the passenger 200.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle seat safety system comprising:
   a vehicle seat configured to move to a substantially reclining position, the vehicle seat comprising a seat back and a seat bottom;
   a first support arm associated with the seat back, the first support arm including a first airbag on a lower surface of the first support arm, the first support arm holding the first airbag in a position above the thorax of a passenger reclining in the vehicle seat,
   wherein the first airbag inflates in the event of a collision and provides protection between the first support arm and the thorax of the passenger;
   a second support arm associated with the seat bottom, the second support arm including a second airbag on a lower surface of the second support arm, the second support arm holding the second airbag in a position above the thighs of the passenger, and the second airbag configured to inflate vertically downwardly from the lower surface toward the thighs of the passenger; and
   a first housing including springs configured to resist vertically upward movement of the second arm caused the vertically downward inflation of the second airbag.

2. The vehicle seat safety system of claim 1, further comprising a second housing associated with the seat back, wherein the first support arm comprises a base section mounted within the second housing.

3. The vehicle seat safety system of claim 2, wherein the first support arm comprises an upper section that holds the first airbag in position above the thorax of the passenger.

4. The vehicle seat safety system of claim 3, wherein the base section and the upper section of the first support arm are rotatably coupled to allow the passenger to enter and exit the vehicle seat.

5. The vehicle seat safety system of claim 3, wherein the base section and the upper section of the first support arm are rotatably coupled by a first hinge that allows the upper section to be rotated into a position above the thorax of the passenger.

6. The vehicle seat safety system of claim 5, wherein the first hinge is lockable.

7. The vehicle seat safety system of claim 6, wherein the base section of the first support arm is spring mounted within the second housing such that the first support arm may extend outward from the second housing when the first airbag is inflated.

8. The vehicle seat safety system of claim 1, wherein the second airbag inflates in the event of a collision and provides protection between the second support arm and the thighs of the passenger.

9. The vehicle seat safety system of claim 8, wherein the second support arm comprises a base section mounted within the first housing.

10. The vehicle seat safety system of claim 9, wherein the second support arm comprises an upper section that holds the second airbag in position above the thighs of the passenger.

11. The vehicle seat safety system of claim 10, wherein the base section and the upper section of the second support arm are rotatably coupled to allow the passenger to enter and exit the vehicle seat.

12. The vehicle seat safety system of claim 10, wherein the base section and the upper section of the second support arm are rotatably coupled by a second hinge that allows the upper section to be rotated into a position above the thighs of the passenger.

13. The vehicle seat safety system of claim 12, wherein the second hinge is lockable.

14. The vehicle seat safety system of claim 13, wherein the base section of the second support arm is spring mounted within the first housing such that the second support arm may extend outward from the first housing when the second airbag is inflated.

15. A method of operating a vehicle seat safety system associated with a vehicle seat configured to move to a substantially reclining position, the vehicle seat comprising a seat back and a seat bottom, the method comprising:
   holding using a first support arm a first airbag in a position above the thorax of a passenger reclining in the vehicle seat, wherein the first support arm is associated with the seat back;
   holding using a second support arm a second airbag in a position above the thighs of the passenger reclining in the vehicle seat, the second airbag configured to inflate vertically downwardly from the second support arm toward the thighs of the passenger, the second support arm associated with the seat bottom,
   detecting a collision;
   in response to the collision, inflating the first airbag to provide protection between the first support arm and the thorax of the passenger;
   in response to the collision, inflating the second airbag vertically downwardly from the second support arm toward the thighs of the passenger; and
   using springs within a housing, resisting vertically upward movement of the second arm caused the vertically downward inflation of the second airbag.

16. The method of claim 15, wherein the seat back comprises a first housing and the first support arm comprises a base section mounted within the first housing.

17. The method of claim 16, wherein the first support arm comprises an upper section that holds the first airbag in position above the thorax of the passenger.

18. The method of claim 17, wherein the base section and the upper section of the first support arm are rotatably coupled to allow the passenger to enter and exit the vehicle seat.

19. The method of claim 18, wherein the base section and the upper section of the first support arm are rotatably coupled by a first hinge that avows the upper section to be rotated into a position above the thorax of the passenger.

\* \* \* \* \*